US011457289B2

United States Patent
Su et al.

(10) Patent No.: US 11,457,289 B2
(45) Date of Patent: Sep. 27, 2022

(54) LOW LATENCY BROADCASTING OF GAME ENGINE FRAMES

(71) Applicant: Microsoft Technology Licensing, LLC, Redmond, WA (US)

(72) Inventors: Shaoxiang Su, Beijing (CN); Dhruv Manchanda, Redmond, WA (US); Gerald A. Pogue, Jr., Redmond, WA (US); Shiqi Wang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 577 days.

(21) Appl. No.: 15/902,803

(22) Filed: Feb. 22, 2018

(65) Prior Publication Data

US 2019/0261062 A1 Aug. 22, 2019

(51) Int. Cl.
*H04N 21/81* (2011.01)
*G06T 13/20* (2011.01)
*H04N 21/2187* (2011.01)
*G06T 1/20* (2006.01)
*G06T 1/60* (2006.01)
*G06T 15/00* (2011.01)

(52) U.S. Cl.
CPC ........... *H04N 21/8173* (2013.01); *G06T 1/20* (2013.01); *G06T 1/60* (2013.01); *G06T 13/20* (2013.01); *G06T 15/005* (2013.01); *H04N 21/2187* (2013.01); *G06T 2200/16* (2013.01)

(58) Field of Classification Search
CPC ...... H04H 20/42; H04H 60/32; H04L 65/403; H04L 65/4076; H04L 65/605; H04L 67/38; H04N 19/146; H04N 19/188; H04N 19/436; H04N 19/61; H04N 21/233; H04N 21/2343; H04N 21/2381; H04N 21/2405; H04N 21/242; H04N 21/4781; H04N 21/6125; H04N 21/6405; H04N 21/6587; A63F 13/12; A63F 13/20; A63F 13/25; A63F 13/335; A63F 13/355; A63F 13/358; A63F 13/837; A63F 2300/203; A63F 2300/402; A63F 2300/407; A63F 2300/534; A63F 2300/538; A63F 2300/552; A63F 2300/554; A63F 2300/5553; A63F 2300/572; A63F 2300/577; A63F 2300/636; A63F 2300/69; A63F 2300/8076

See application file for complete search history.

(56) References Cited

U.S. PATENT DOCUMENTS 8,723,875 B2    5/2014  Green et al.
9,384,276 B1 *  7/2016  Cooper .................. G06F 16/70
(Continued)

OTHER PUBLICATIONS

"Game Engine Integrations", Retrieved From <<https://web.archive.org/web/20170630173953/https:/gpuopen.com/gaming-product/game-engine-integrations/>>, Jun. 30, 2017, 2 Pages.

(Continued)

*Primary Examiner* — Rong Le
(74) *Attorney, Agent, or Firm* — Holzer Patel Drennan (57) ABSTRACT

A system for low latency broadcast of animation frames includes a frame extractor stored in memory and executable to access frame data generated by a rendering pipeline of a frame generation engine. During runtime of the frame generation engine, the frame extractor exports the frame data for use external to the frame generation engine.

20 Claims, 5 Drawing Sheets

(56) References Cited

U.S. PATENT DOCUMENTS

| | | | |
|---|---|---|---|
| 9,446,305 B2* | 9/2016 | Dietrich, Jr. | A63F 13/358 |
| 9,530,386 B2 | 12/2016 | Kp et al. | |
| 2015/0128195 A1* | 5/2015 | Kunigita | H04N 21/4307 |
| | | | 725/82 |
| 2017/0372494 A1* | 12/2017 | Zhu | G06T 9/00 |

OTHER PUBLICATIONS

"Low-level Native Plugin Interface", Retrieved From <<https://web.archive.org/web/20151008035317/https:/docs.unity3d.com/Manual/NativePluginInterface.html>>, Oct. 8, 2015, 4 Pages.

"NVIDIA has Released GameWorks VR and DesignWorks VR SDKs for VR Developers", Retrieved From <http://3dvision-blog.com/9371-nvidia-has-released-gameworks-vr-and-designworks-vr-sdks-for-vr-developers/>>, Nov. 20, 2015, 3 Pages.

"Optimizing graphics performance", Retrieved From <<https://web.archive.org/web/20160510150542/https:/docs.unity3d.com/Manual/OptimizingGraphicsPerformance.html>>, May 10, 2016, 6 Pages.

Ashida, Koji, "Optimising the Graphics Pipeline", Retrieved From <<http://www.nvidia.in/docs/IO/10878/ChinaJoy2004_OptimizationAndTools.pdf>>, Retrieved on: Jan. 12, 2018, 45 Pages.

Lasram, Anas, "AMD Crossfire API", Retrieved From <<https://gpuopen.com/amd-crossfire-api/>>, May 5, 2016, 9 Pages.

Reed, et al., "VR Direct: How NVIDIA technology is improving the VR Experience", Retrieved From <<https://web.archive.org/web/20151007192743/http:/developer.download.nvidia.com/assets/events/GDC15/GEFORCE/VR_Direct_GDC_2015.pdf>>, Oct. 7, 2015, 57 Pages.

Wilhelmsen, Martin Alexander., "Real-Time Interactive Cloud Applications", In Master's Thesis of University of Oslo, 2014, 106 Pages.

* cited by examiner

LOW LATENCY BROADCASTING OF GAME ENGINE FRAMES

BACKGROUND

User demand for low-latency online video streaming technology has increased in recent years due, in part, to the rising popularity of live video streaming services such as video blogging and live game play streaming that permits individuals to watch the live game play of others without themselves actively participating. Although these video streaming services may advertise live streaming, many popular technologies in this area actually induce significant delay times between initial video capture and video broadcast. In some cases, users are able to perceive indicators of these delays. For example, some live game streaming services facilitate communications between individuals engaging in live game play (gamers) and spectators viewing the game play broadcast. If a gamer's outgoing communications are embedded within the broadcast video, a spectator viewing the broadcast may notice several seconds of delay between his own input and a received response from the gamer.

SUMMARY

According to one implementation, a system includes a frame extractor stored in memory and executable to access frame data generated by a rendering pipeline of a frame generation engine and to export the frame data for use external to the frame generation engine. The system further includes a broadcasting agent stored in the memory and executable by the processor to broadcast the frame data exported from the frame generation engine for viewing on a remote spectating device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

The herein disclosed technology facilitates capture and broadcast of video content at a high frame rate and low latency. Broadcasting a live video (e.g., a video blog, gameplay) across the internet generally entails recording and subsequently broadcasting multiple short segments of video (such as video segments 2-3 seconds in length), each segment including a few frames of the video. During this process, each short video segment may be written to a disk as a video file, opened back up, read into an application, encoded, and finally broadcast for viewing by a spectator logged into a spectating system (e.g., a website for viewing live video feeds). The writing of each video segment to disk and subsequent reading of each segment into the application prior to broadcast may induce several seconds (e.g., 5-10 seconds) of delay into the broadcast process, meaning that the video is not really "live" when viewed.

Although a number of alternatives have been proposed to reduce latencies in online live video broadcasts, these alternative solutions tend to offer limited reductions in latency at the cost of increased processing overhead that undesirably reduces a maximum attainable frame rate. In one such solution, a game engine or system application programming interface (API) captures a series of screenshots and caches those screenshots as images that are, in turn, broadcast in lieu of a video file or multiple short video files (as described above). However, this solution entails waiting multiple CPU cycles to take each screenshot, writing each screenshot to disk, reading the screenshot back from disk, and compressing each screenshot prior to broadcast. The overhead of this solution is too cumbersome to implement without a significant reduction in the frame rate (e.g., a rate that is much lower than a rate of frames output by a game engine).

Still another proposed solution for broadcasting live game play entails reading pixels of each frame into a byte array inside of a game engine and passing the byte array to a native application (e.g., an application that performs the broadcasting). However, differences between the development environment and computing language of the game engine and native application can cause differences in byte formats and/or color incompatibility. As a result, data and/or color format conversions may be employed to translate each raw frame into an appropriate format for broadcast. While this solution may allow for lower latency than the traditional method of recording video segments to disk, these data and/or color conversions increase processing overhead and adversely affect frame rate and/or broadcasting latency.

The herein disclosed technology provides a tool that facilitates online broadcast of video frames generated by a game engine at a high frame rate (e.g., a same frame rate as the rate of frames output by the game engine) and at a much lower latency than the latency observed in existing video broadcast technologies. In one implementation, the foregoing is achieved via operations performed by a low-level game engine plugin that makes individual frames of raw frame data generated by a game engine available for broadcast outside of the game engine. Due to the data handling techniques utilized by the low-level game engine plugin, the raw data can be broadcast without conversions of byte format and/or color format. In one implementation, the disclosed technology facilitates broadcast of game engine frames at a rate of 20-40 frames per second and a broadcast latency (e.g., between initial frame capture and frame broadcast) of around 200-400 milliseconds.

Figure 1:
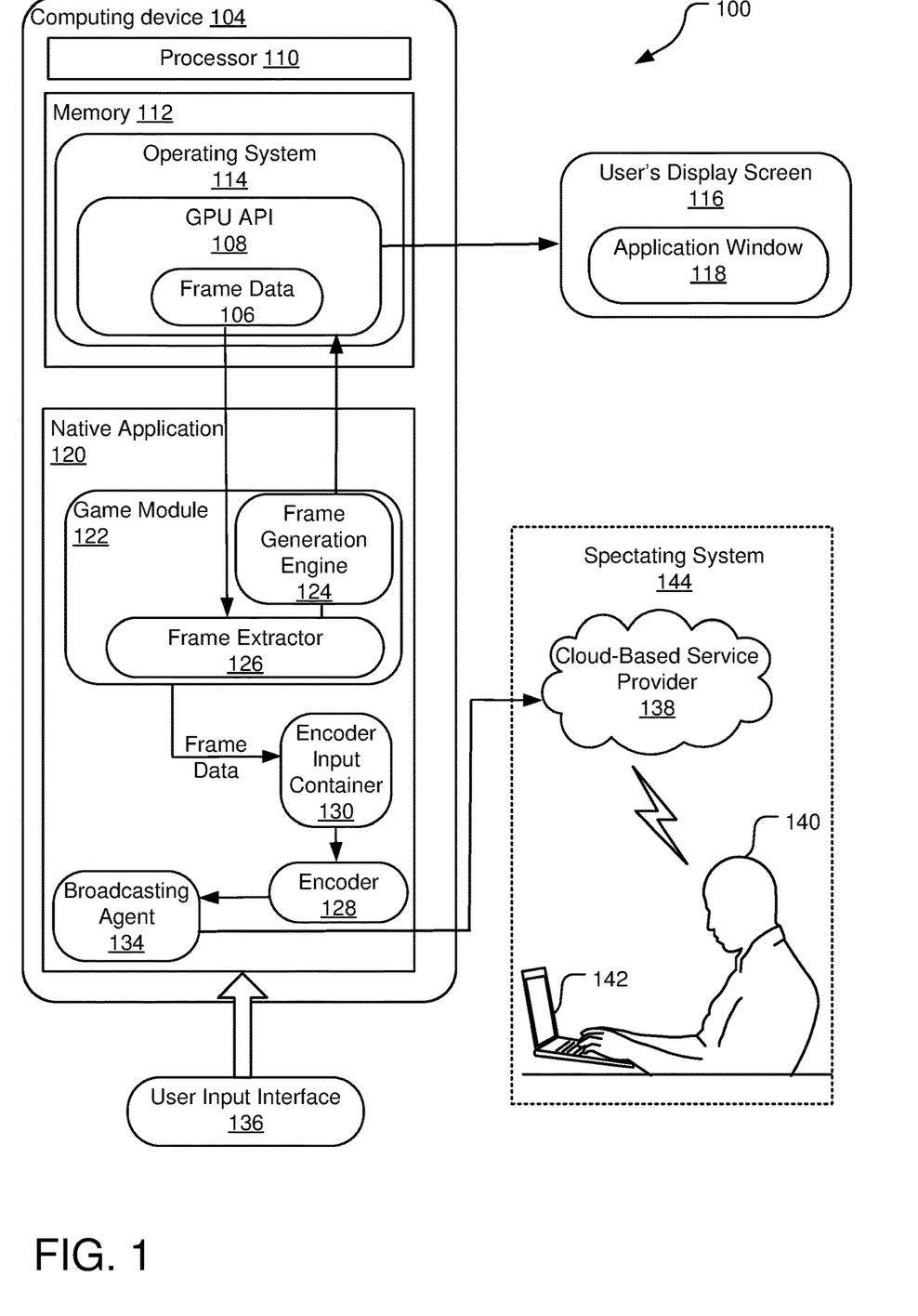
FIG. 1 illustrates an example system that facilitates low-latency broadcasting of game engine frames.

FIG. 1 illustrates an example system 100 that facilitates low-latency broadcasting of game engine frames. The system includes a computing device 104 including a processor 110 configured to locally execute a native application 120 and receive user input from a user input interface 136 usable to affect actions of the native application 120. In different implementations, the computing device 104 may assume different forms including without limitation a mobile device (e.g., a mobile phone or table), a game console, or a personal computer.

The native application 120 may be any locally-executable application stored in memory 112 of the computing device 104 that is compatible with an operating system 114 of the computing device 104. In an implementation where the computing device 104 is a mobile phone running on the Android® operating system, for example, the native application 120 is an android application. The native application 120 includes or otherwise communicates with a game module 122 to initiate actions by a frame generation engine 124 (e.g., a game engine) from within the native application 120, making the game or application of the game module 122 accessible to a user through an application window 118 of the native application 120.

In one non-limiting example intended to exemplify one of many possible relations between the native application 120 and the game module 122, the native application 120 is the popular mobile application Facebook® and the game module 122 is a third-party game that is adapted to be played from within the Facebook® mobile application, such as by broadcasting live game play from one device to another. In another implementation, the native application 120 captures live video with a camera (not shown) of the computing device 104 and utilizes the gaming module to inject game engine effects (e.g., graphics, animations) into the video stream. In another implementation, the native application 120 performs operations that allow data created by the frame generation engine 124 to be displayed onto multiple different application windows. In still another implementation, the native application 120 utilizes an encoder 128 and the broadcasting agent 134 to encode and broadcast data created by the game engine without offering significant additional functionality.

In one implementation, the game module 122 includes code exported from a game engine development environment that is executable to instruct the frame generation engine 124 to generate 3D frames. In some implementations, the game module 122 is a game (in the traditional sense); in other implementations, the game module 122 is a non-game application that otherwise utilizes the frame generation engine 124 to render graphics to a user's display screen 116.

In contrast to the game module 122, the frame generation engine 124 communicates with an application programming interface (API) of the graphics processing unit (GPU) (e.g., with the GPU API 108) to actually request the generation the 3D frames by the GPU (not shown). The GPU API 108, in turn, sends control signals to a graphics chip to render the frame data to the application window 118 in the user's display screen 116 of the computing device 104.

In one implementation, the frame generation engine 124 is a game engine. Game engines are widely used to implement highly encapsulated GPU operations that simplify the work that a game developer (e.g., a developer of the game module 122) performs when writing code to render complex animation effects. The frame generation engine 124 may be a cross-platform (compatible with different operating systems) and is, in many implementations, developed and provided by a different party than the developer of the game module 122. Example game engines that are currently popular in the market include without limitation Unity®, Unreal®, and Amazon Lumberyard®.

Although the frame generation engine 124 simplifies rendering of complex animation effects, game engines typically operate as closed systems in that a large amount of data generated by the frame generation engine 124 is not available outside of the frame generation engine 124. Consequently, data of the frame generation engine 124 may be inaccessible to the game module 122 and the native application 120. For example, the frame generation engine 124 communicates with the GPU API 108 to generate frame data 106 (e.g. a series of frames) that collectively create a 3D scene when rendered in series to the user's display screen 116. Although the frame data 106 is provided to the GPU for rendering, the frame data 106 is not traditionally available to higher-level modules executing on the computing device 104, such as the game module 122 or native application 120.

As used herein, the terms "high-level" and "low-level" are similar to those used in other computing scenarios, wherein in general, the lower a software component is relative to higher components, the closer that component is to the hardware. The GPU API 108 is very low-level because it communicates directly with the graphics chip (not shown). The frame generation engine 124 talks directly to the GPU API 108 and is therefore also at a low-level compared to the game module 122 and native application 120, which are even further removed from the graphics chip along the communications chain.

As used herein, the term "frame data" refers to the raw graphics frame data generated by the GPU API 108 responsive to instructions from the frame generation engine 124. Each frame of the frame data 106 is usable to construct a complete frame of the animation that is rendered to the application window 118.

In addition to the components described above, the memory 112 additionally stores a frame extractor 126 (e.g., a low-level plugin to the frame generation engine 124) that is coupled to a rendering pipeline of the frame generation engine 124. The frame extractor 126 (also referred to herein as a "game engine frame extractor") has access to a rendering context of the frame generation engine 124. By initializing an instance of this rendering context (as explained more with respect to FIGS. 2-3, below), the frame extractor 126 gains access to the frame data 106 that is created by the GPU API 108 during run-time of the frame generation engine 124. Due to the way in which data is shared between the GPU API 108 and the frame extractor 126, the GPU API 108 renders the frame data 106, directly onto an encoder input container 130, without color or format conversion. The encoder input container 130 is encoded by the encoder 128 of the native application 120 and the broadcasting agent 134 of the native application 120 utilizes communication circuitry (not shown) of the computing device 104 to transmit the encoded frame data across a network, such as across a Broadband internet or cellular connection, to a spectating system 144.

In one implementation, the spectating system 144 includes a cloud-based service provider 138, such as a network-based video streaming system or service that supports live streaming of broadcasts from various devices with broadcasting capability. The spectating system 144 may support live broadcasts for multiple different game consoles and/or other game-execution devices to tens, hundreds, or thousands of spectating devices, such as a spectating device 142. As used herein, the term "spectating device" is used to refer to a device that presents a live or recorded application broadcast (e.g., a game play broadcast) to a user (also referred to herein as a "spectator"). For example, a spectator 140 may interact with a user interface of the cloud-based service provider 138 to select and play back recordings received from various broadcast devices, such as a game play stream broadcast by the computing device 104.

When the frame data 106 is accessed by the frame extractor 126 and exported from the frame generation engine 124 in the manner described above, the frame data 106 generated by the GPU API 108 can be broadcast to the spectating system 144 and played back on the spectating device 142 at a much lower latency than that achieved using other live video broadcast solutions. This reduced latency is due, in part, to the direct rendering of the frame data 106 by the GPU API 108 onto the input of the encoder. As a result of this rendering, the frame data 106 is not at any time saved to or read back from non-volatile memory, the omission of which reduces broadcast latency. In one implementation, the processing overhead associated with this approach is low enough to permit the frame data 106 to be streamed at a frame rate substantially identical to the rate at which the rendering pipeline of the frame generation engine 124 renders frames to the application window 118. In other implementations, the frame data 106 is broadcast to the spectating system 144 at a frame rate lower or higher than the frame rate of the frame generation engine 124, depending on frame complexity.

Figure 2:
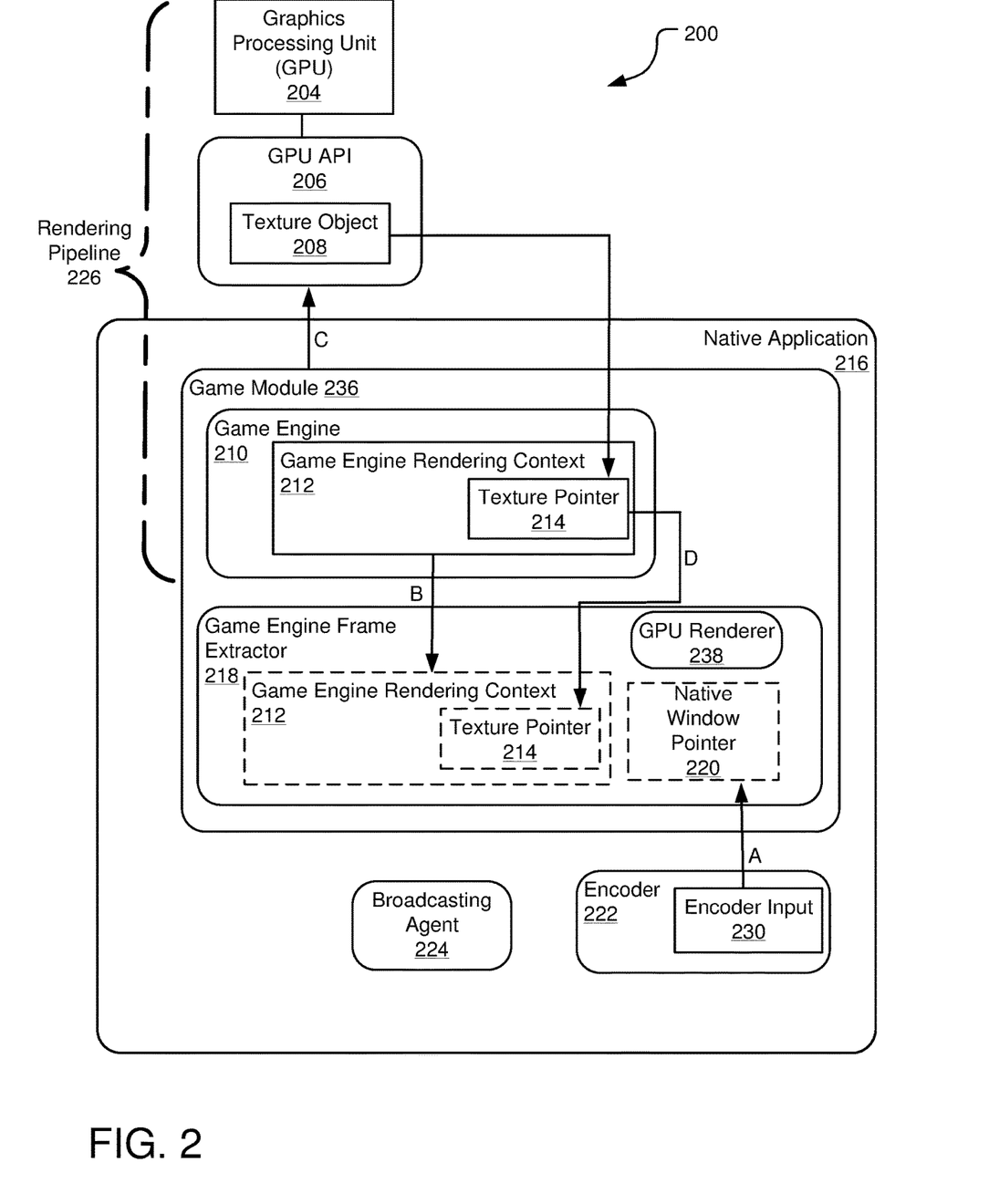
FIG. 2 illustrates setup operations to ready a system to provide low-latency broadcasting of game engine frames.

FIG. 2 illustrates setup operations to ready a system 200 to provide low-latency broadcasting of game engine frames. The system includes a rendering pipeline 226 for rendering graphics to a display (not shown). The rendering pipeline 226 includes at least a game engine 210, a GPU API 206, and a GPU 204. The game engine 210 communicates with the GPU API 206 to request the rendering of 3D graphics by the GPU 204. The GPU API 206 executes the instructions of the game engine 210 and in doing so, generates frame data that is attached to a texture object 208. The GPU API 206 also generates and transmits control signals that cause the GPU 204 to render the frame data to a display (not shown).

The game engine 210 is, in FIG. 2, incorporated into (called from) a game module 236, which is itself incorporated into a native application 216. When the game module 236 is executed, the associated game or application is made accessible to a user through a window of the native application 216.

A game engine frame extractor 218 (e.g., a plug-in to the game engine 210) is coupled to the rendering pipeline 226 and communicates directly with the game engine 210 to access objects generated during runtime. Once initialized, the game engine frame extractor 218 performs actions to access frame data placed in the texture object 208 and to make the frame data available to an encoder 222 and a broadcasting agent 224 that execute outside of the game engine 210. In FIG. 2, the encoder 222 and the broadcasting agent 224 are "outside of" the game engine 210 in the sense that these modules lack access to objects and data created by the game engine 210 absent the operations performed by the game engine frame extractor 218.

During a first setup operation (labeled "A" in FIG. 2), an encoder input 230 is converted to a native window pointer 220 and passed to the game engine frame extractor 218. As a result of this operation, the game engine frame extractor 218 can render graphics data to an application window object of the native application 216 and pass this application window object to the encoder 222.

During a second setup operation (labeled "B" in FIG. 2), the game engine frame extractor 218 retrieves and caches a game engine rendering context 212 of the game engine 210. Using this cached information, the game engine frame extractor 218 initializes a copy of the game engine rendering context 212. This game engine rendering context 212 within the game engine frame extractor 218 is initialized in such a way that the game engine frame extractor 218 can share certain object data that is available to the game engine 210.

During a third setup operation (labeled "C" in FIG. 2), the game engine 210 instructs the GPU API 206 to create various objects in memory including the texture object 208.

As mentioned above, the texture object 208 can be used by the game engine 210 to render frame data of a 3D animation scene. Through the game engine rendering context 212, the game engine 210 receives a texture pointer 214 that points to the memory location of the texture object 208. The texture pointer 214 can be used by the game engine 210 to request rendering of the frame data to a display (not shown).

During a fourth setup operation (labeled "D" in FIG. 3), the texture pointer 214 is passed from the game engine 210 to the game engine frame extractor 218. A GPU renderer 238 (a separate GPU rendering program) is initialized within the game engine frame extractor 218. In the illustrated example, the GPU renderer 238 renders the frame data generated during runtime by the game engine 210 directly onto the texture object 208. Since the game engine frame extractor 218 owns a pointer to the texture object 208, the game engine frame extractor 218 can initiate a separate rendering to copy data of the texture object 208 onto the native window object (not shown) associated with the native window pointer 220. In other implementations, the texture object 208 is not utilized by the game engine 210 when rendering the frame data onto the native window object. This data flow (e.g., rendering the frame data onto an object created by the game engine) is encapsulated by the game engine 210 and may vary depending on the architecture of the game engine in any given implementation.

Figure 3:
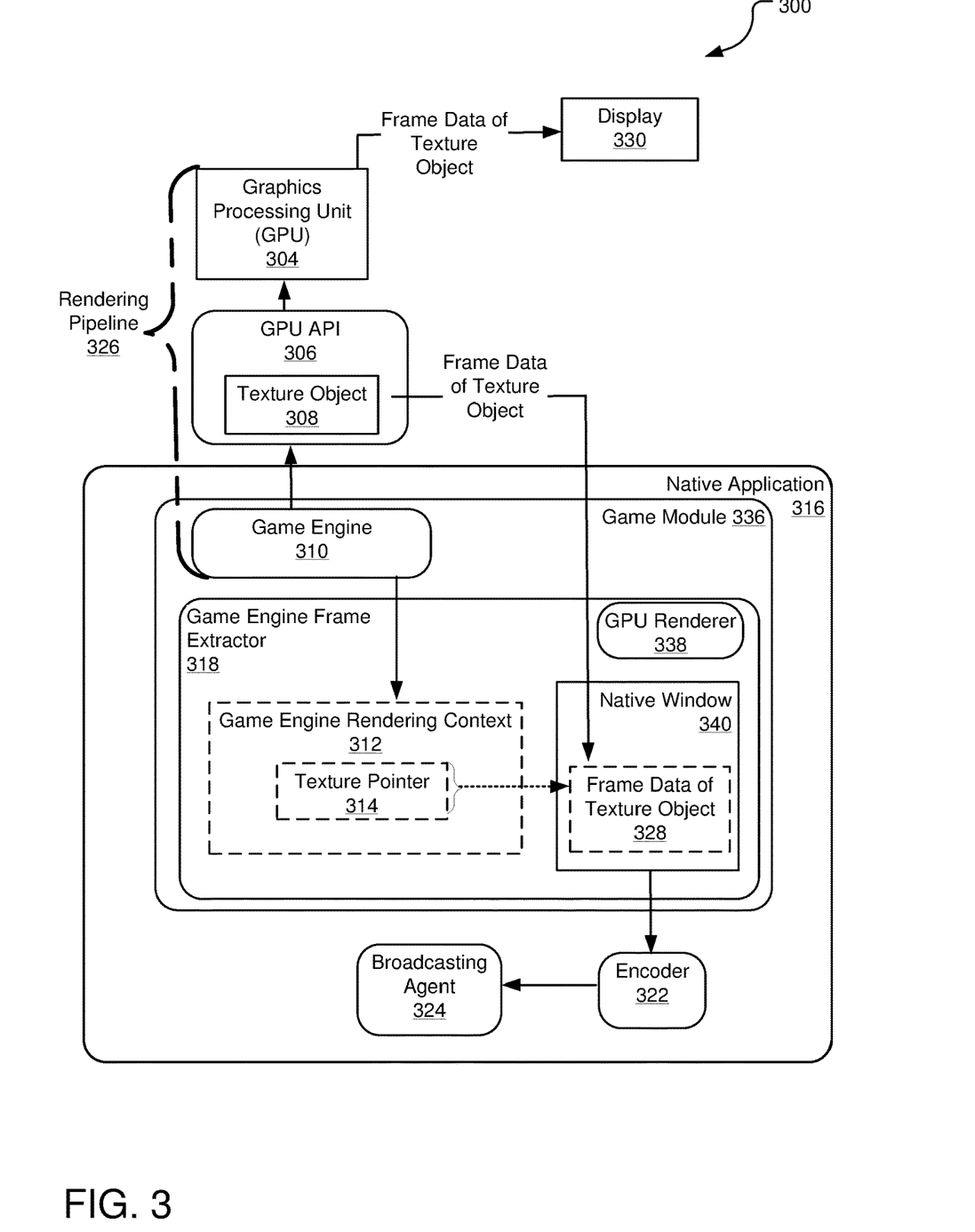
FIG. 3 illustrates runtime operations of a system that provides low-latency broadcasting of game engine frames.

FIG. 3 illustrates runtime operations of a system 300 that provides low-latency broadcasting of game engine frames. In one implementation, the system 300 is set-up for runtime in a manner the same or similar as that described above with respect to FIG. 2. The system includes a rendering pipeline 326 for rendering graphics to a display 330 which is, for example, a display of an electronic device including hardware of the rendering pipeline 326 and locally-executes software of the rendering pipeline 326.

The rendering pipeline 326 includes at least a game engine 310, a GPU API 306, and a GPU 304, which perform the same or similar operations to those described with respect to corresponding elements in FIG. 2. The game engine 310 is incorporated into a game module 336, which is itself incorporated into a native application 316. When the game module 336 is executed, the associated game or application is made accessible to a user through a window of the native application 316.

A game engine frame extractor 318 is coupled to the rendering pipeline 326 and performs actions to access frame data that the game engine 310 attaches to a texture object 308 during runtime. Additionally, the game engine frame extractor 318 exports the frame data to various modules (such as an encoder 322 and a broadcasting agent 324) that execute outside of the game engine 310 without independent access to objects and data produced by the game engine 310.

During runtime, the game engine 310 initiates a series of operations that propagate various actions down the rendering pipeline 326 to render frame data to the display 330. During this process, the frame data is generated and presented onto the texture object 308. As described with respect to FIG. 2, a texture pointer 314 may be shared with the game engine frame extractor 318 through a game engine rendering context 312 that initializes during set-up. The texture pointer 314 is associated with a memory location of the texture object 308 created by the GPU API 306. Using the texture pointer 314, the game engine frame extractor 318 accesses frame data of the texture object 308 that is generated by the game engine 310 during runtime.

A GPU renderer 338 (a separate rendering program within the game engine frame extractor 318) instructs the GPU API 306 to render frame data of the texture object 308 directly onto a native window 340 of the native application 316. The native window 340 is, for example, an object that stores data for presentation on an application window. In one implementation, the GPU renderer 338 instructs the GPU API 306 to render the frame data of the texture object 308 by providing the GPU API 306 with a native window pointer (e.g., obtained during setup as described with respect to FIG. 2) that identifies a memory space associated with the native window 340.

The game engine frame extractor 318 provides the native window 340 to the encoder 322, which encodes the frame data of the texture object 308 and provides the encoded frame data to the broadcasting agent 324. The broadcasting agent 324, in-turn, broadcasts the encoded data to a spectating system (not shown) for remote viewing.

Since the GPU API 306 renders the frame data of the texture object 308 directly onto the input of the encoder 322, overhead due to memory copy (e.g., saving and read-back from a non-volatile memory location) can be avoided. As a result, broadcast latencies are reduced as compared to existing broadcast solutions. With this approach, the byte format and color format are preserved since the frame data is captured directly from the GPU API 306 and transferred without a formatting conversion. As a result of this, processing overhead remains low enough that the system 300 can encode and broadcast the frame data at a high frame rate (e.g., the same frame rate as the output frame of the game engine 310).

Figure 4:
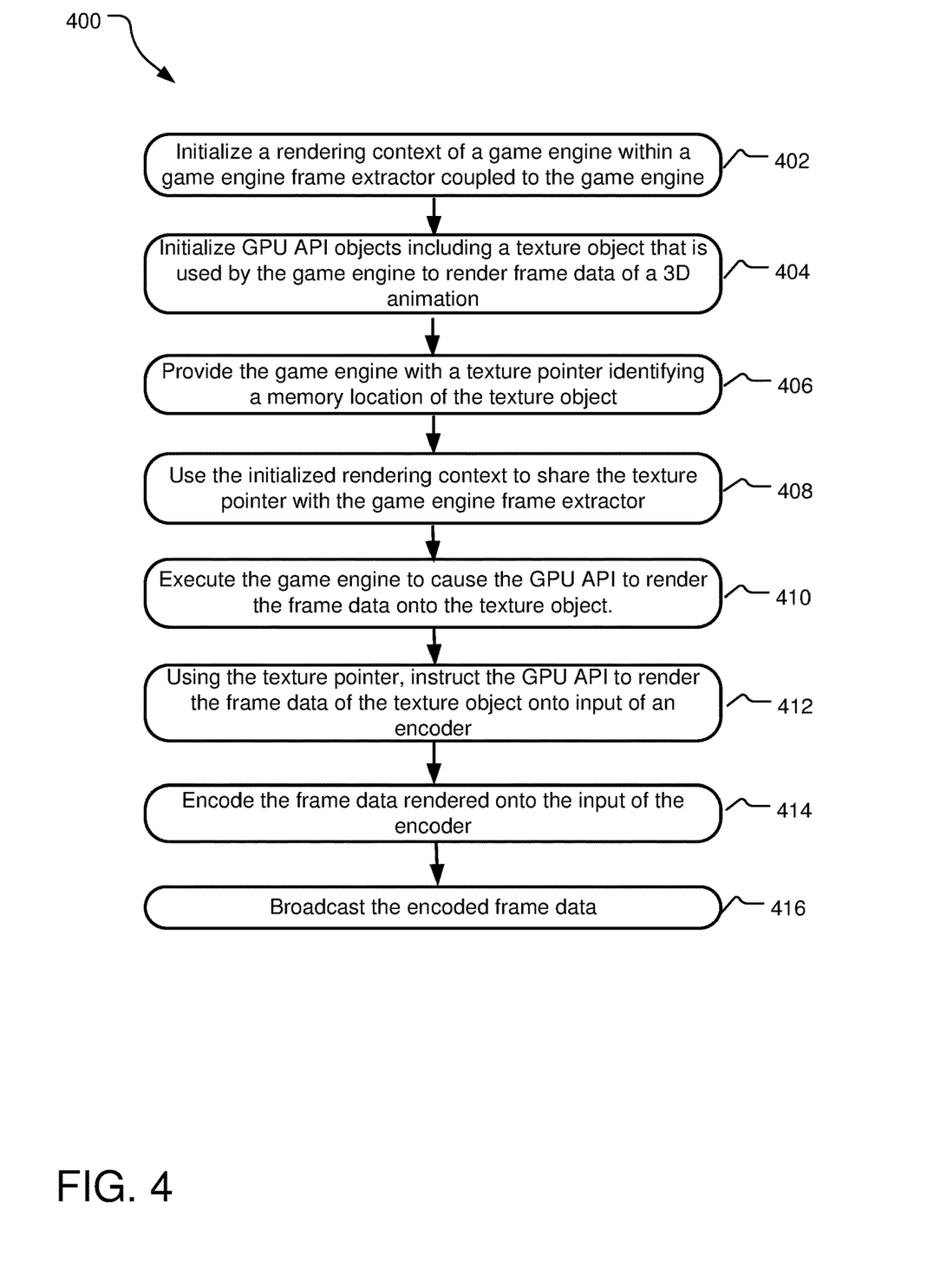
FIG. 4 illustrates example operations for low-latency broadcasting of game engine frames.

FIG. 4 illustrates example operations 400 for low-latency broadcasting of game engine frames. An initializing operation 402 initializes a rendering context of a game engine within a game engine frame extractor (e.g., a low-level game engine plug-in) coupled to a game engine rendering pipeline.

Another initializing operation 404 creates various objects within a graphics processing unit application programming interface (GPU API), including a texture object that is created by the game engine and used by the game engine to render frame data of a 3D animation to a display.

A pointer provisioning operation 406 provides the game engine with a texture pointer that identifies a memory location of the texture object. A sharing operation 408 shares the texture pointer between the game engine and the game engine frame extractor using the initialized rendering context.

A runtime data creation operation 410 executes the game engine to present frame data onto the texture object. While the game engine is presenting the frame data onto the texture object, a rendering operation 412 also renders the frame data of the texture object onto input of an encoder that executes external to the game engine. In one implementation, the rendering operation 412 uses the texture pointer obtained through the pointer provisioning operation 406 to specify the frame data requested for rendering. Additionally, the rendering operation 412 specifies a native window as the location for the rendering of the frame data. The native window is subsequently provided as input to an encoder; thus, the rendering operation 412 effectuates rendering of the frame data directly onto the input of the encoder.

An encoding operation 414 encodes the native window (including the rendered frame data) and a broadcasting operation 416 broadcasts the native window to a spectating system where the native window is decoded and presented as a series of frames at a frame rate substantially similar to an output frame rate of the game engine.

Figure 5:
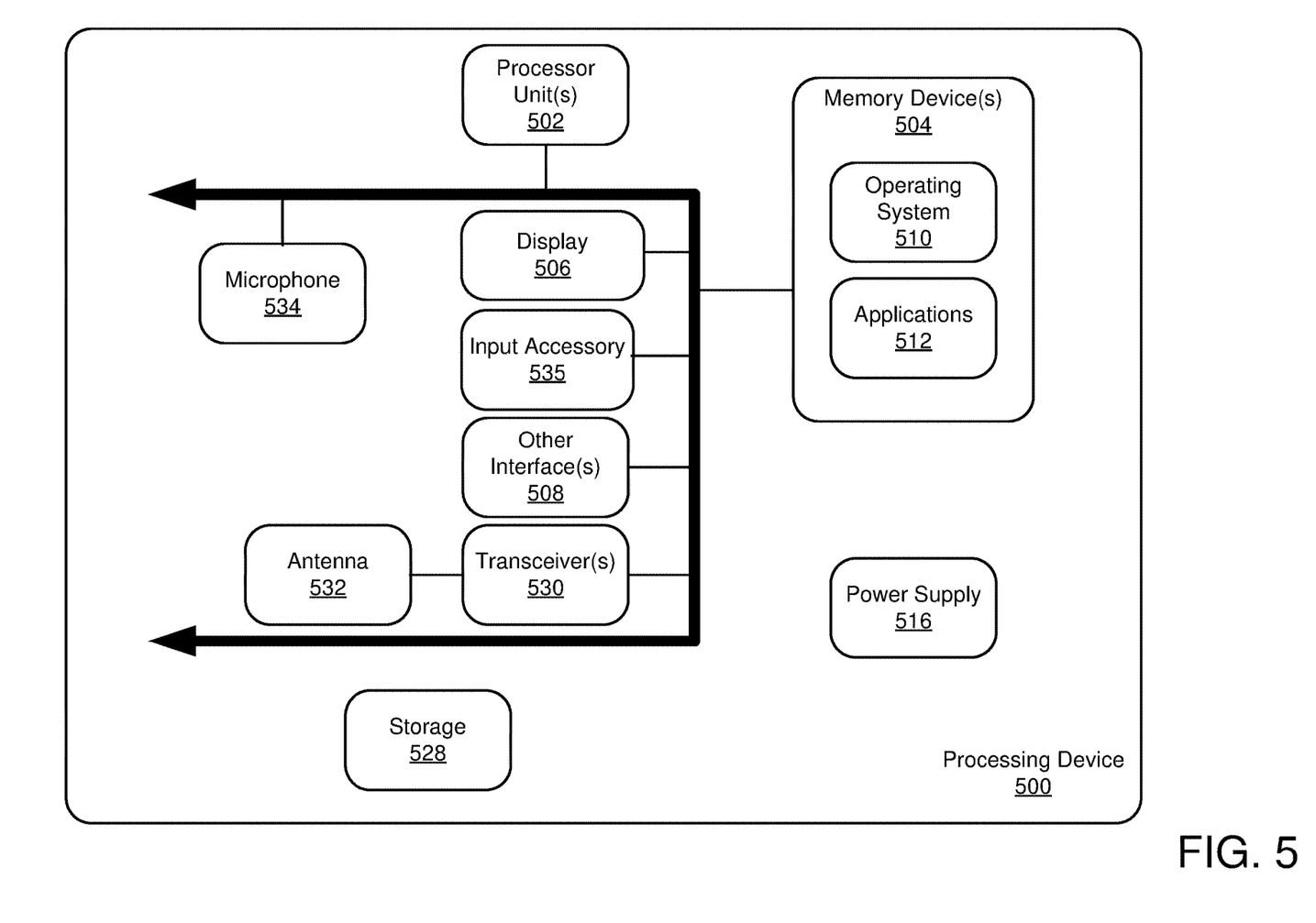
FIG. 5 illustrates an example schematic of a processing device suitable for implementing aspects of the disclosed technology.

FIG. 5 illustrates an example schematic of a processing device 500 suitable for implementing aspects of the disclosed technology. In various implementations, the processing device 500 may represent any one or more of a broadcasting device, spectating device, game controller, or game execution device. The processing device 500 includes one or more processor unit(s) 502, memory 504, a display 506, and other interfaces 508 (e.g., buttons). The memory 504 generally includes both volatile memory (e.g., RAM) and non-volatile memory (e.g., flash memory). An operating system 510, such as the Microsoft Windows® operating system, the Microsoft Windows® Phone operating system or a specific operating system designed for a gaming device, resides in the memory 504 and is executed by the processor unit(s) 502, although it should be understood that other operating systems may be employed.

One or more applications 512, are loaded in the memory 504 and executed on the operating system 510 by the processor unit(s) 502. The applications 512 may receive input from various input devices such as a microphone 534 or input accessory 535 (e.g., keypad, mouse, stylus, touchpad, gamepad, racing wheel, joystick). The processing device 500 includes a power supply 516, which is powered by one or more batteries or other power sources and which provides power to other components of the processing device 500. The power supply 516 may also be connected to an external power source that overrides or recharges the built-in batteries or other power sources.

The processing device 500 includes one or more communication transceivers 530 and an antenna 532 to provide network connectivity (e.g., a mobile phone network, Wi-Fi®, Bluetooth®). The processing device 500 may also include various other components, such as a positioning system (e.g., a global positioning satellite transceiver), one or more accelerometers, one or more cameras, an audio interface (e.g., a microphone 534, an audio amplifier and speaker and/or audio jack), and storage devices 528. Other configurations may also be employed.

In an example implementation, a mobile operating system, various applications (e.g., a native application 120, as shown in FIG. 1 above) and other modules and services (e.g., game module 122 and frame generation engine 124 as shown in FIG. 1 above), game engine frame extractor 218 (as shown in FIG. 2 above)) may have hardware and/or software embodied by instructions stored in memory 504 and/or storage devices 528 and processed by the processor unit(s) 502. The memory 504 may be memory of host device or of an accessory that couples to a host.

The processing device 500 may include a variety of tangible computer-readable storage media and intangible computer-readable communication signals. Tangible computer-readable storage can be embodied by any available media that can be accessed by the processing device 500 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 500. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

An example system for low-latency communication of frame data includes a frame extractor stored in memory and executable by a processor to access frame data generated by a rendering pipeline of a frame generation engine and to export the frame data for use external to the frame generation engine. The system further includes a broadcasting agent stored in the memory and executable by the processor to broadcast the frame data exported from the frame generation engine for viewing on a remote spectating device.

In another example system of any preceding system, the frame generation engine is a game engine.

In another example system of any preceding system, the frame generation engine is communicatively coupled to a graphics processing unit application programming interface (GPU API) via the rendering pipeline and the frame data is generated by the GPU API.

In another example system of any preceding system, the GPU API renders the frame data onto input of an encoder external to the frame generation engine without modifying the frame data.

In yet another example system of any preceding system, the broadcasting agent is executable to receive encoded frame data output from the encoder and to broadcast the encoded frame data to a spectating system for viewing on a remote spectating device.

In still another example system of any preceding system, the frame extractor accesses the frame data by initializing a rendering context of the frame generation engine, the rendering context of the frame generation engine associated with a pointer identifying a location of an object created by a GPU API and usable by the frame generation engine to render frames to a display.

In another example system of any preceding system, the frame extractor is further executable to use the pointer to draw data of the object onto input of an encoder.

Another example system disclosed herein includes a means for accessing frame data generated by a rendering pipeline of a frame generation engine; a means for exporting the frame data for use external to the frame generation engine; and a means for broadcasting the exported frame data for viewing on a remote spectating device.

An example tangible computer-readable storage media encodes computer-executable instructions for executing on a computer system a computer process comprising: accessing frame data generated by a rendering pipeline of a frame generation engine; exporting the frame data for use external to the frame generation engine; and broadcasting the exported frame data for viewing on a remote spectating device.

In an example computer process of any preceding computer process, the frame generation engine is a game engine.

In another example computer process of any preceding computer process, the frame generation engine is communicatively coupled to a graphics processing unit application programming interface (GPU API) via the rendering pipeline and the frame data is generated by the GPU API.

In still another example computer process of any preceding computer process, the computer process further comprises: rendering the frame data onto input of an encoder external to the frame generation engine without altering a format of the frame data.

In still another example computer process of any preceding computer process, accessing the frame data further comprises initializing a rendering context of the frame generation engine, the rendering context of the frame generation engine associated with a pointer identifying a location of an object created by a GPU API and usable by the frame generation engine to render frames to a display.

In another example computer process of any preceding computer process, the computer process further comprises using the received pointer to draw data of the object onto input of the encoder.

An example device disclosed herein includes a processor, memory, and a frame extractor stored in memory and executable by the processor to access frame data generated by a rendering pipeline of a frame generation engine and to export the frame data for use external to the frame generation engine. The device further comprises a broadcasting agent stored in the memory and executable by the processor to broadcast the frame data exported from the frame generation engine for viewing on a remote spectating device.

In another example device of any preceding device, the frame generation engine is a game engine.

In another example device of any preceding device, the frame data includes unmodified output of a graphics processing unit application programming interface (GPU API), the GPU API communicatively coupled to the frame generation engine along the rendering pipeline.

In another example device of any preceding device, the device further includes an encoder stored in memory and executable to receive and encode the frame data generated by the GPU API.

In still another example device of any preceding device, the frame extractor accesses the frame data by initializing a rendering context of the frame generation engine, the rendering context of the frame generation engine associated with a pointer identifying a location of an object created by a GPU API and usable by the frame generation engine to render frames to a display.

In still another example device of any preceding device, the frame extractor uses the pointer to draw data of the object onto input of an encoder.

In another example device of any preceding device, the frame extractor exports the frame data for external use by a computing module stored in the memory, the computing module being higher-level than the frame generation engine with respect to a graphics processing unit (GPU).

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A device for low-latency communication of frame data comprising:
 a processor;
 memory;
 a graphics processing unit application programming interface (GPU API) stored in the memory that executes instructions from a frame generation engine for rendering frame data of a first data stream to a local display of the device, the frame data being generated by a rendering pipeline of the frame generation engine;
 a frame extractor stored in the memory and executable by the processor to access the frame data generated by the rendering pipeline of the frame generation engine and to export the frame data to a second data stream for use external to the frame generation engine; and
 a broadcasting agent stored in the memory and executable by the processor to broadcast the frame data of the second data stream exported from the frame generation engine for viewing on a remote spectating device.

2. The device of claim 1, wherein the frame generation engine is a game engine.

3. The device of claim 1, wherein the frame generation engine is communicatively coupled to the GPU API via the rendering pipeline and the frame data is generated by the GPU API.

4. The device of claim 1, wherein the GPU API renders the frame data onto input of an encoder external to the frame generation engine without modifying the frame data.

5. The device of claim 4, wherein the broadcasting agent is executable to receive encoded frame data output from the encoder and to broadcast the encoded frame data to a spectating system for viewing on a remote spectating device.

6. The device of claim 1, wherein the frame extractor accesses the frame data by initializing a rendering context of the frame generation engine, the rendering context of the frame generation engine associated with a pointer identifying a location of an object created by the GPU API and usable by the frame generation engine to render frames to a display.

7. The device of claim 6, wherein the frame extractor is further executable to use the pointer to draw data of the object onto input of an encoder.

8. One or more tangible computer-readable storage media of a tangible article of manufacture encoding computer-executable instructions for executing on a computer system a computer process, the computer process comprising:
 accessing frame data generated by a rendering pipeline of a frame generation engine within a device;
 executing, by a GPU API, instructions from the frame generation engine for rendering a first data stream of the frame data to a local display of the device;
 exporting a second data stream of the frame data for use external to the frame generation engine; and
 broadcasting the exported frame data of the second data stream for viewing on a remote spectating device.

9. The one or more tangible computer-readable storage media of claim 8, wherein the frame generation engine is a game engine.

10. The one or more tangible computer-readable storage media system of claim 8, wherein the frame generation engine is communicatively coupled to the GPU API via the rendering pipeline and the frame data is generated by the GPU API.

11. The one or more tangible computer-readable storage media of claim 8, wherein the computer process further comprises:
 rendering the frame data onto input of an encoder external to the frame generation engine without altering a format of the frame data.

12. The one or more tangible computer-readable storage media of claim 8, wherein accessing the frame data further comprises:
 initializing a rendering context of the frame generation engine, the rendering context of the frame generation engine associated with a pointer identifying a location of an object created by the GPU API and usable by the frame generation engine to render frames to a display.

13. The one or more tangible computer-readable storage media of claim 12, further comprising:
 using the received pointer to draw data of the object onto input of the encoder.

14. A device comprising:
 a processor;
 memory;
 a graphics processing unit application programming interface (GPU API) stored in the memory and executable to render a first data stream of frame data to a local display of the device, the frame data being generated by a rendering pipeline of a frame generation engine;
 a frame extractor stored in the memory and executable by the processor to access the frame data generated by the rendering pipeline of the frame generation engine and to export a second data stream of the frame data for use external to the frame generation engine; and
 a broadcasting agent stored in the memory and executable by the processor to broadcast the second data stream of the frame data exported from the frame generation engine for viewing on a remote spectating device, the export and broadcast of the frame data being performed without first saving the frame data to non-volatile memory of the device.

15. The device of claim 14, wherein the frame generation engine is a game engine.

16. The device of claim 14, wherein the frame data includes unmodified output of the GPU API, the GPU API being communicatively coupled to the frame generation engine along the rendering pipeline.

17. The device of claim 16, further comprising:
an encoder stored in memory and executable to receive and encode the frame data generated by the GPU API.

18. The device of claim 14, wherein the frame extractor accesses the frame data by initializing a rendering context of the frame generation engine, the rendering context of the frame generation engine associated with a pointer identifying a location of an object created by the GPU API and usable by the frame generation engine to render frames to a display.

19. The device of claim 18, wherein the frame extractor uses the pointer to draw data of the object onto input of an encoder.

20. The device of claim 14, wherein the frame extractor exports the frame data for external use by a computing module stored in the memory, the computing module being higher-level than the frame generation engine with respect to a graphics processing unit (GPU).

\* \* \* \* \*